US011330546B1

(12) United States Patent
Yannuzzi et al.

(10) Patent No.: US 11,330,546 B1
(45) Date of Patent: May 10, 2022

(54) CONTROLLED ACCESS TO GEOLOCATION DATA IN OPEN ROAMING FEDERATIONS

(71) Applicant: Cisco Technology, Inc., San Jose, CA (US)

(72) Inventors: Marcelo Yannuzzi, Nuvilly (CH); Herve Muyal, Gland (CH); Bart A. Brinckman, Nevele (BE); Vikas S. Murthy, Stockton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/119,677

(22) Filed: Dec. 11, 2020

(51) Int. Cl.
| | |
|---|---|
| *H04W 60/00* | (2009.01) |
| *H04W 4/029* | (2018.01) |
| *H04W 12/63* | (2021.01) |
| *H04W 12/06* | (2021.01) |
| *H04L 29/08* | (2006.01) |
| *H04L 67/55* | (2022.01) |

(52) U.S. Cl.
CPC ............ *H04W 60/00* (2013.01); *H04L 67/26* (2013.01); *H04W 4/029* (2018.02); *H04W 12/06* (2013.01); *H04W 12/63* (2021.01)

(58) Field of Classification Search
CPC ..... H04W 36/22; H04W 8/245; H04W 12/06; H04W 12/08; H04W 48/18; H04W 8/06; H04W 12/084; H04W 88/16; H04W 8/08; H04W 36/0016; H04W 48/20
See application file for complete search history.

(56) References Cited

U.S. PATENT DOCUMENTS

| | | | |
|---|---|---|---|
| 9,973,892 B1 | 5/2018 | Parshin et al. | |
| 2007/0187481 A1* | 8/2007 | Kearney | G06Q 10/10 235/379 |

(Continued)

FOREIGN PATENT DOCUMENTS

| | | |
|---|---|---|
| EP | 3723013 A1 | 10/2020 |
| WO | 2011017921 A1 | 2/2011 |
| WO | 2020046348 A1 | 3/2020 |

OTHER PUBLICATIONS

WBA Members, "IoT Interoperability Dynamic Roaming," wballiance, May 22, 2018, 66 pages.

(Continued)

*Primary Examiner* — Kwasi Karikari
(74) *Attorney, Agent, or Firm* — Patterson + Sheridan, LLP

(57) ABSTRACT

Embodiments herein registers Asset Owners (AOs) and AO applications to a location, aggregation, and insight (LAI) service that are part of the same identity federation. When registering the AO with the LAI service, the AO selects which of a plurality of Identity Providers (IDPs) it has a relationship with, and the LAI service can then bind those IDPs to the AO application. This binding associates respective realms (e.g., domains) corresponding to the selected IDPs to the AO application. Later, when a device owned by the AO roams to a visited network (VN), the LAI service can then use a realm identified from a device ID provided by the device to identify the ID of the AO application. The LAI service then enables the VN to transmit a location of the device to the AO application. In one embodiment, the VN obtains consent from the AO before sharing location data.

20 Claims, 7 Drawing Sheets

(56) References Cited

U.S. PATENT DOCUMENTS

2008/0259851 A1* 10/2008 Kozisek .............. H04W 12/084
　　　　　　　　　　　　　　　　　　　　　　　　370/329
2009/0112875 A1*  4/2009 Maes ..................... G06Q 10/06
2012/0131642 A1   5/2012 Zheng et al.
2012/0176970 A1   7/2012 Jin et al.

OTHER PUBLICATIONS

PCT, Notificaton of Transmittal of The International Search Report and The Written Opinion of The International Searching Authority, or The Declaration for Application PCT/US2021/061224 dated Feb. 25, 2022.

* cited by examiner

TABLE 300

| Home - Realm / DNS ID | | Authorized tenant ID | | AO App ID |
|---|---|---|---|---|
| unknown | + | (Token 1, tenantID = X) | + | URL_X |
| ...... | + | ...... | + | ...... |
| unknown | + | (Token n, tenantID = X) | + | URL_X |

FIG. 3

TABLE 400

| Home - Realm / DNS ID | | Authorized tenant ID | | AO App ID |
|---|---|---|---|---|
| NS1.000008.netids.lora-alliance.org | + | (Token 1, tenantID = X) | + | URL_X |
| ...... | + | ...... | + | ...... |
| enterprise_X.com | + | (Token n, tenantID = X) | + | URL_X |

FIG. 4

CONTROLLED ACCESS TO GEOLOCATION DATA IN OPEN ROAMING FEDERATIONS

TECHNICAL FIELD

Embodiments presented in this disclosure generally relate to exchanging location data among domains within an identity federation.

BACKGROUND

Given supply chains that extend across borders and different internet service providers, there is growing need to track shipments in ports, warehouses, supply chains and other segments where location data must be accessible both to Asset Owners (AOs) and to the operators that handle the shipments, either in transit or at their final destinations. To track the shipments or parcels, the AO may attach wireless devices that can communicate with wireless networks such as Wi-Fi networks, LoRa networks, or cellular networks. The AO, however, may not operate wireless networks and instead rely on third-party providers to manage the identity, authentication, and life-cycle of its wireless devices used to track shipments. The AO must rely on a visited network (e.g., a wireless network provided by a seaport, airport, or cellular network) to communicate with the wireless devices, identify their locations, and push those locations to the AO.

Currently, there is no way to securely provide location data to the AO, unless the visited network and the AO have an already established agreement, or use a common application. The visited network can use hyper-location in Wi-Fi, multilateration in cellular, TDOA/RSSI in LoRa, mechanisms based on UWB or combinations of them to identify the location of the AO's devices; however, these data are not accessible to third parties, such as AOs. Building ad hoc solutions to share location data between visited networks and AOs suffer both from scalability and trust issues, since the number and diversity of AOs whose devices (e.g., tags) could potentially connect to and transit (e.g., roam) through networks in many different ports, warehouses, and countries might be very large. In addition, privacy requirements dictate that identity and location data should be shared exclusively between entities that have agreed upon specific terms and conditions, thereby restricting the scope and limits of such data exchange. Without a solution, AOs often lose track of their devices (and corresponding shipments) when they move from outdoors to indoor (e.g., inside a warehouse) or when roaming costs become prohibitive.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 is a table for binding an AO application to an identity provider, according to one embodiment described herein.

FIG. 4 is a table for binding an AO application to an identity provider, according to one embodiment described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
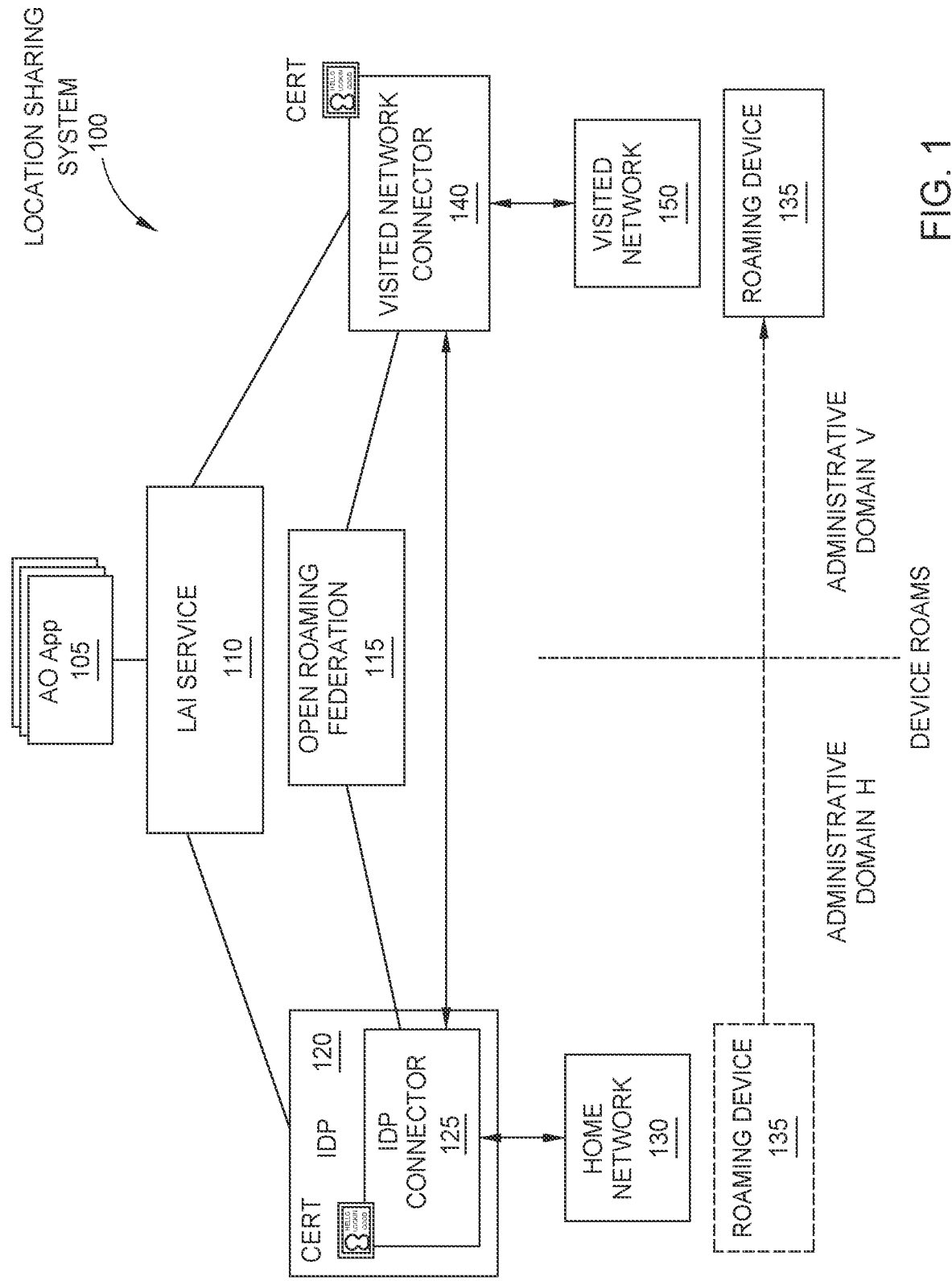
FIG. 1 illustrates a location sharing system using an identity federation, according to one embodiment described herein.

One embodiment presented in this disclosure is a method that includes registering a plurality of identity providers (IDPs) with a location, aggregation, and insights (LAI) service, where the LAI service, the plurality of IDPs, and an asset owner (AO) are part of an identity federation. The method also includes registering the AO with the LAI service where registering the AO comprises selecting one of more of the IDPs already registered with the LAI service and binding, in the LAI service, the selected IDPs to an AO application of the AO where the selected IDPs and the AO application have respective realms in common. After detecting a device has roamed to a visited network (VN) in the identity federation, the method includes receiving a realm associated with the device at the LAI service from the VN. The method also includes identifying, at the LAI service, the AO application by matching the received realm to one of the respective realms and enabling the VN to push location information corresponding to the device to the AO application.

Other embodiments include a computing system and a non-transitory computer readable medium having program instructions for performing an operation which includes registering a plurality of IDPs with a LAI service where the LAI service, the plurality of IDPs, and an AO are part of an identity federation and registering the AO with the LAI service where registering the AO comprises selecting one of more of the IDPs already registered with the LAI service. The operation also includes binding, in the LAI service, the selected IDPs to an AO application of the AO, wherein the selected IDPs and the AO application have respective realms in common and, after detecting a device has roamed to a VN in the identity federation, receiving a realm associated with the device at the LAI service from the VN. The operation includes identifying, at the LAI service, the AO application by matching the received realm to one of the respective realms and enabling the VN to push location information corresponding to the device to the AO application.

EXAMPLE EMBODIMENTS

Embodiments herein registers AOs and an AO application to a location, aggregation, and insight (LAI) service that are both part of the same open roaming federation (or more generally, an identity federation). It is in the interest of both AOs and the enterprises that own visited networks (VN) to get access to positioning data. Hence, there is a need for new techniques that allow VN owners to dynamically discover AOs and share location data with the AOs in a controlled, trustful and consented way, irrespective of the access technology used. This is particularly relevant in open roaming scenarios, where VNs rely on dynamically establishing trust not only with Identity Providers (IDPs) during the authentication phase but also with AOs.

A plurality of IDPs (which can be an AO, or a separate third-party service) is registered to the LAI service. When registering the AO with the LAI service, the AO selects which of the plurality of IDPs it uses (e.g., has a contractual relationship with), and the LAI service can then bind those IDPs to the AO using digital certificates. This binding associates respective realms (e.g., domains) corresponding to the selected IDPs to the AO application. This binding is stored in the LAI service as a table that links the realms owned by the selected IDPs to an ID of the AO application. Later, when a device owned by the AO roams to a VN (e.g., a network not controlled by the AO or its IDPs), the LAI service can use the table to match a realm associated with the device to one of the realms of the registered IDPs. The LAI service can then use the matched realm to identify the ID of the AO application. The LAI service then enables the VN to begin transmitting location data associated with the device to the AO application using its ID. In this manner, an AO's devices can roam to any VN which is part of the same identity federation as the AO, and the VN can dynamically (e.g., on-the-fly) establish a secure and trusted relationship with the AO so that location data can be pushed to the AO application. As such, the embodiments herein do not have to rely on establishing pre-existing relationships between AOs and potential VNs before these networks can share location data of roaming devices to the AOs.

FIG. 1 illustrates a location sharing system 100 using an identity federation, according to one embodiment described herein. The system 100 permits a VN 150 (also referred to as an access network (AN)) to dynamically discover the ID of an AO application 105 for a roaming device 135 that has roamed to the VN 150. The embodiments herein apply when the AO and an IDP 120 are different entities, though it is not restricted to that case. Further, the embodiments herein can be used in a multi-RAN scenario where the AO application 105 is the target for sharing location data for the devices 135 owned by the AO. Location data can be fed to the AO application 105 both when the devices 135 are connected to their home networks (e.g., the home network 130) as well as when they roam to the VN 150 as shown in FIG. 1.

The embodiments below also describe techniques for automatically binding a set of device IDs to the corresponding AO. In one embodiment, the device IDs are supplied directly by the IDPs 120 on behalf of the AO. Also, the owner/operator of the VN 150 can dynamically manage its policy and get explicit consent to share location data with the AO applications 105. This ensures that data disclosures are only sent to the AO, subject to the AO's explicit consent and policy defined by the owner of the VN 150 (e.g., the owner for the VN 150 may choose not to disclose any location data). In other examples, an AO might be able to provide explicit consent to the VN 150 to share location data with a third-party (e.g., for data analysis purposes, for logistics, for subcontractors, etc.).

A VN Connector 140 coupled to the VN 150 interoperates with IDP Connectors 125 associated with the home network 130. These connectors 140, 125 provide means for dynamic discovery of peers, dynamic establishment of secure tunnels, and carrying identity and authentication packets requiring neither previous knowledge nor pre-established peering agreements between the IDPs 120 and the VNs 150. Each VN 150 may have associated one or more VN Connectors 140 (e.g., one for Wi-Fi, one for LoRa, one for PLTE, one for 5G, and so on, or they might all be integrated as a single entity).

The system 100 includes an open roaming federation 115 that establishes trust between the IDPs 120 and VNs 150 so that roaming devices 135 can be authenticated using credentials stored in the IDP 120. However, the embodiments herein can be applied to any identity federation that establishes trust between VNs and IDPs 120 so that roaming devices 135 can be identified. Generally, the open roaming federation 115 permits the VN 150 to authenticate the roaming device 135 so that the device 135 can attach to the VN 150. However, the embodiments herein leverage the open roaming federation 115 to further enable a VN 150 to establish trust with the AO applications 105 so that location data (or other metadata) regarding the roaming devices 135 can be shared with the AO applications 105 or a third-party entity.

Once a roaming device is authenticated, the VN 150 can track the roaming device (e.g., using Wi-Fi, cellular, or LoRa location techniques) and determine whether the location of the device 135 should be shared with the AO application 105 (or some other third-party entity). To do so, the VN 150 communicates with a LAI service 110 which can provide the VN 150 with the ID of the AO application 105. The LAI service 110, which is a trusted service to the perspective of the VN 150, can establish trust between the VN 150 and the AO application 105 when these entities may not have had a previous relationship of trust. Once trust is established, the VN 150 can begin pushing location data regarding the device 135 to the AO application 105 or a third-party entity indicated by the AO application 105.

In one embodiment, the LAI service 110 includes one or more computing systems that include one or more processor and memory. In one embodiment, the LAI service 110 is a software application executing on one or more computing systems.

Figure 2:
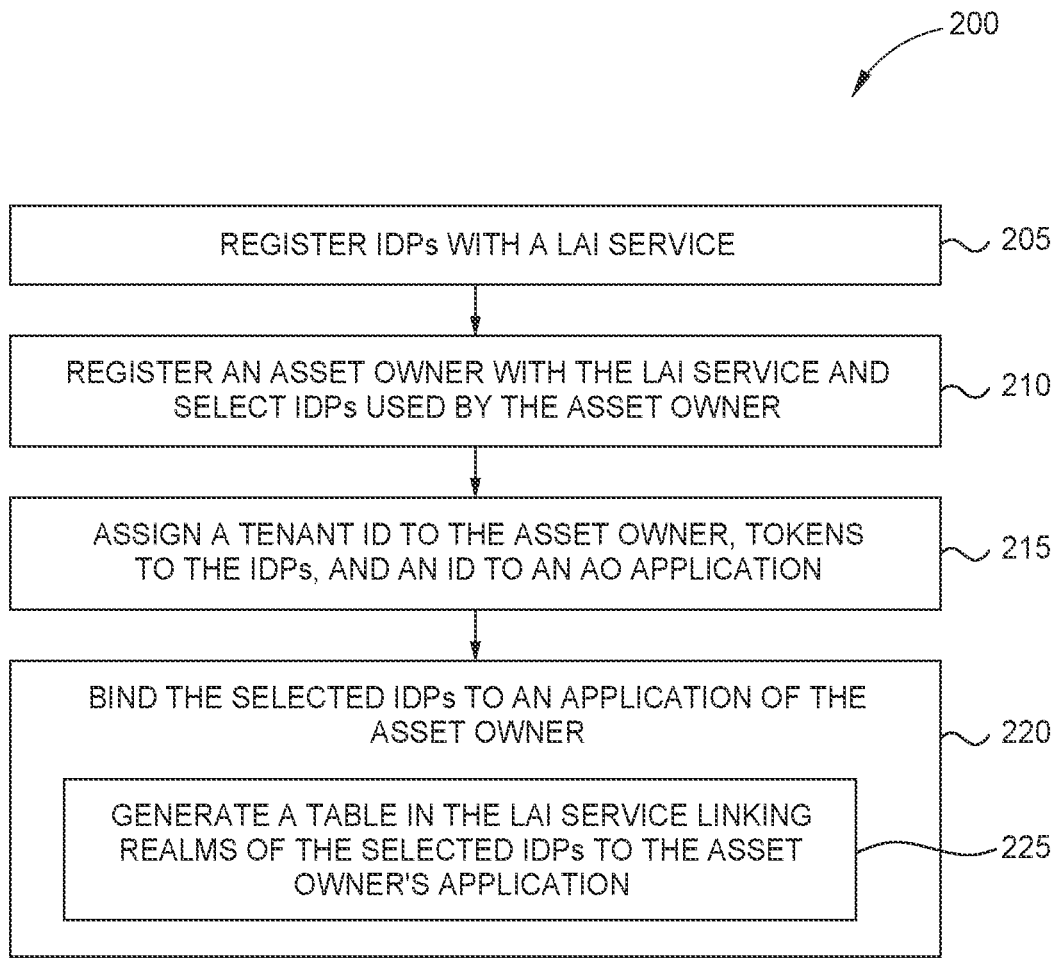
FIG. 2 is a flowchart for binding an AO application to an Identity Provider (IDP)_in a location, aggregation, and insight (LAI) service, according to one embodiment described herein.

FIG. 2 is a flowchart of a method 200 for binding an AO application to an IDP in a LAI service, according to one embodiment described herein. In one embodiment, the method 200 is performed before a device (e.g., the roaming device 135) roams to a VN (e.g., the VN 150). Specifically, the method 200 can be performed to establish a relationship of trust between the AO, IDPs, and the LAI service. That way, later when a device owned by the AO roams to a VN in the same identity federation as the LAI service, the LAI service can establish a relationship of trust between the VN and the AO (or more specifically, between the VN and the AO application) so the VN can push location data associated with the device to the AO.

At block 205, the IDPs register with the LAI service. For example, Each IDP may or may not require a IDP connector to interface with the LAI service. For example, a Wi-Fi IDP might push data directly to the LAI service using native automation rules (i.e., without requiring a connector between the IDP and the LAI service). However, other IDPs, such as LoRa networks servers, mobile manufacturers, enterprises, etc., might use a IDP connector to feed data to the LAI service. In either case, IDPs may interface with the LAI service once registered. Further, the IDPs may, or may not, operate their own VNs in the open roaming federation.

Registering an IDP with the LAI service may include a certificate to establish a trusted connection to the LAI service. The certificates might be issued by a public key infrastructure (PKI) supported by the LAI service itself, by an open roaming federation (which is the case when the IDP is on-boarded in OpenRoaming) or by a trusted third-party infrastructure. In the case where an open roaming federation issues certificates for mutual authentication between the IDP and the VNs during roaming processes, the certificates might be reused to authenticate to the LAI service or new certificates might be issued for the purpose of exchanging identity information.

At block 210, an AO registers with the LAI service and selects IDPs it uses. That is, the AO selects which of the registered IDPs it has a contractual relationship with. In one embodiment, the AO may be an IDP, in which case, it selects itself. Prior to registering with the LAI service, the AO should already have a unique ID and credentials to access its data within each IDP. Thus, the AO will have an ID and credentials to log into its associated IDPs and manage its devices. The AO can have a different set of ID and credentials for each of the IDPs to which it subscribes.

At block 215, the LAI service assigns a tenant ID to the registered AO, unique tokens to the registered IDPs, and an ID to an AO application. If an AO wishes to register more than one category of identities for the same IDP in the LAI service, then the AO selects the IDP as many times as needed and different tokens are assigned to the IDPs by the LAI service. For instance, this might occur when the same entity can act as an IDP for two or more realms on behalf of the AO. In this way, each realm would be associated with only one (token, tenant ID) pair, while multiple tokens could be potentially assigned to the same IDP.

In one embodiment, the AO application is registered with the LAI service at block 215. As mentioned above, the AO application is the destination of data streams originating both from the selected IDPs (e.g., for populating IDs for the devices owned by the AO) and from the VN (e.g., for receiving location updates for the devices owned by the same AO). The AO application has a unique ID within the LAI service (e.g., embodied as an AO application uniform resource identifier (URI)). To this end, the AO application might also have a certificate issued by a PKI trusted by the identity federation.

FIG. 3 is a table 300 in a LAI service storing the tenant ID for a registered ID, tokens to the registered IDPs, and AO application ID, according to one embodiment described herein. As shown, the table 300 includes three columns: a home/realm column, an authorized tenant ID column, and an AO application ID column. Upon registering the IDPs, AO, and AO application, the realms are not yet linked to the AO application ID, which happens in the next block of the method 200. However, the remaining two columns indicate that there are individual tokens (i.e., Token 1-n) assigned to the IDPs and a corresponding tenant ID assigned to the AO (i.e., tenantID=X). That is, the table 300 records each IDP that was selected by the AO having the tenantID X. The third column records the ID of the AO application (i.e., URI_X) corresponding to the AO X. In this manner, the LAI service records which IDPs were selected by the AO, and the ID for its corresponding AO application.

In one embodiment, the LAI service has a different table 300 for each AO. Alternatively, the LAI service has a single table for all the registered AOs, which includes their corresponding selected IDPs and AO applications.

Figure 5:
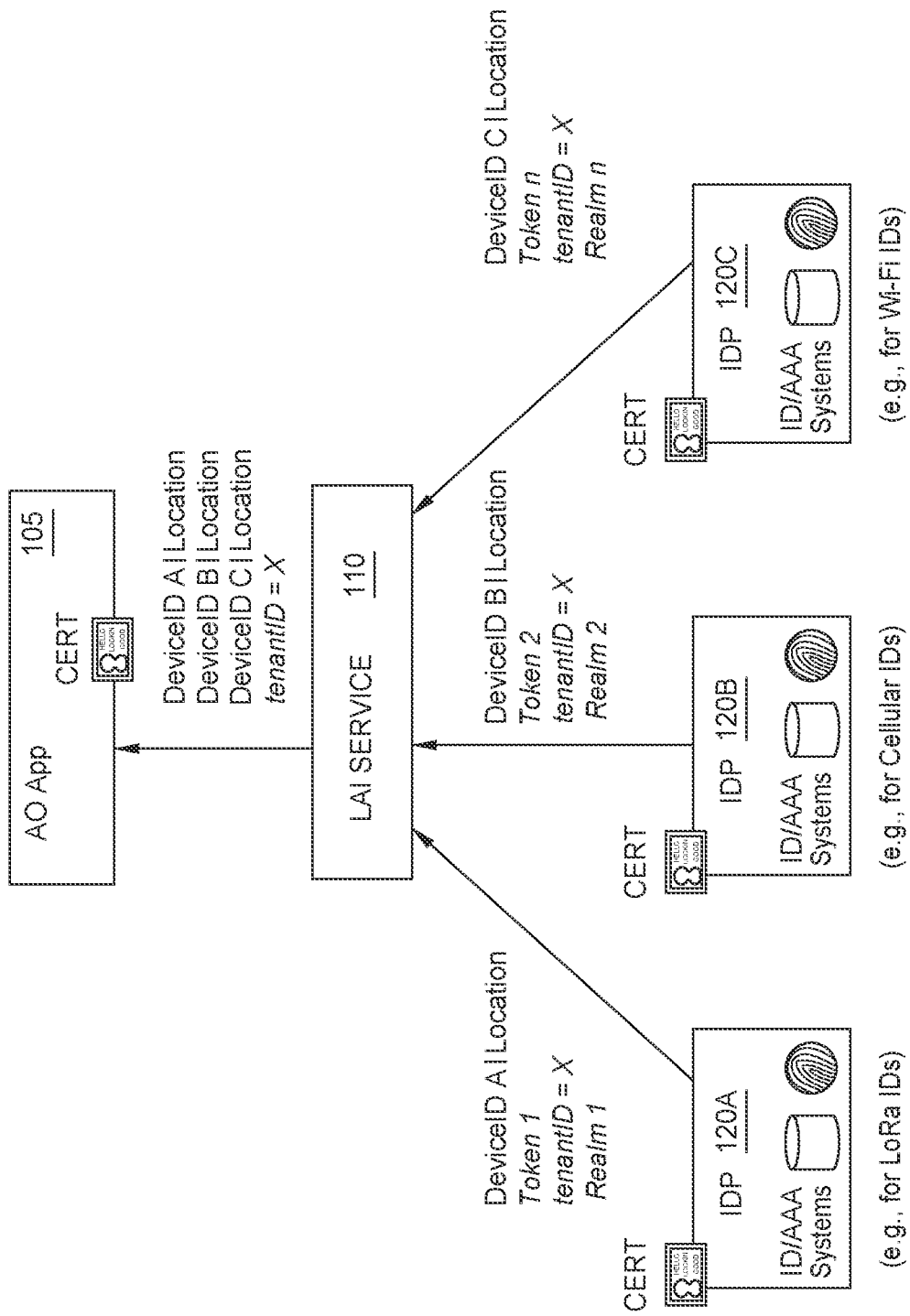
FIG. 5 illustrates a LAI service communicating with identity providers and an AO application, according to one embodiment described herein.

At block 220, the LAI service binds the IDPs selected at block 210 to the AO application. In one embodiment, each IDP may manage a pool of device IDs on behalf of the AO (e.g., one IDP manages a pool of LoRa devices, another IDP manages a pool for cellular devices, another IDP manages a pool of LTE devices, etc. which is illustrated in FIG. 5). The devices may move freely within their home networks as well as roam across other VNs leveraging the open roaming federation. The open roaming federation can use dynamic discovery (DNS resolution) of the IDP based on a realm (e.g., a domain). A PKI used by the open roaming federation issues certificates to attest to the trustworthiness of the realm—i.e., establish an association between the previously registered IDP and the realm. Certificates issued to the IDPs by the PKI may be used to prove ownership of a given realm to the LAI service. The LAI service may also gather such information proactively from other subsystems within an open roaming federation (e.g., directly from the PKI).

When an IDP sends data to the LAI service, it uses a unique (token, tenantID) pair (e.g., the pairs illustrated in the second column of the table 300 in FIG. 3) issued by the LAI service. For instance, in FIG. 3, IDP 1 might use (Token 1, tenantID=X) and may also send to the LAI service the realm used by the AO in the context of that IDP.

At sub-block 225, as part of binding the IDPs to the AO application, the LAI service generates a table linking realms of the selected IDPs to the AO application. FIG. 4 illustrates updating the table in FIG. 3 to include the realms bound to the IDPs and the AO application. For instance, the IDP 1 may send the realm "NS1.000008.netids.lora-alliance.org" to the LAI service which is then stored in the left column. The same process applies to the other IDPs selected by the AO. That is, IDP n can send the realm "enterprise_X.com" which is also stored in the appropriate entry in the left column. Based on this, the LAI service may verify the ownership of the realms (as per the contents of the certificates issued by the federation) and update its state as shown in table 400. Put differently, the LAI service can use the certificates provided by the PKI to the IDPs to establish a relationship of trust with the IDPs. Because of this relationship, the LAI service trusts the IDPs when they indicate which realm the "own" for a particular AO. In the example shown in table 400, the same AO application is bound to two different realms which are each associated with a different IDP, i.e., IDP 1 and IDP n.

Assigning the realms to an IDP also binds the IDPs to the AO applications. In one embodiment, the realms are in, or derived from, the device ID provided by the devices. For instance, in LoRa, the device IDs do not explicitly include the realms. The realms might be built dynamically based on the ID or they could be inferred based on the ID. For instance, the part "netids.lora-alliance.org" is common to any ID. In sum, the realms might be included/provided by the device explicitly, inferred, or built dynamically from the device ID itself. In another example, a device may have an ID of DevAddr_x@NS1.000008.netids.lora-alliance.org. As discussed below, the LAI service can use the realm in the device ID (i.e., "NS1.000008.netids.lora-alliance.org") to map to a unique (token, tenant ID) pair in the table 400. In turn, that (token, tenant ID) pair maps to a unique entry (e.g., row) in the table 400 in which there is only one AO Application ID authorized by the AO. Thus, any devices in that realm map to the same AO application. In this manner, because the realm is owned by the IDP (which has a relationship of trust with the LAI service), the LAI service uses table 400 to bind that realm (and thus, the IDP) to the AO application.

FIG. 5 illustrates the LAI service 110 communicating with IDPs 120 and the AO application 105, according to one embodiment described herein. As already mentioned, the AO application 105 is the consumer of location data that is sent by the VNs and brokered and streamed by the LAI service 110 (where streaming occurs exclusively for the devices owned by the AO). The process below describes a potential embodiment to ensure trusted ID ownership and data flows across the LAI service 110, which can be used in certain portions of the method 200.

Device ID ownership might be handled in the following way within the LAI service. As shown in FIG. 5, the device IDs might be fed directly by the sources, i.e., by the IDPs. In this way, the LAI service 110 does not broker messages for identities and/or data claimed or entered by the AO. More specifically, device IDs can be fed automatically by the IDPs 120 themselves, since IDPs 120 are the source of truth for the device IDs they manage. Hence, AOs do not have to manually enter a device ID or claim any device ID in the LAI service 110 since this is handled by the IDPs 120. This also applies to device IDs supplied by the entities that act as IDPs on behalf of the AO.

In one embodiment, based on a root of trust (e.g., by using a PKI), and mutually authenticated interfaces, the LAI service 110 enables the binding of device IDs managed by the IDPs 120 to a specific AO application 105. This binding is captured in the table 400 in FIG. 4. The data flows used to populate the table 400 in FIG. 4 and feed the AO Application 105 with device IDs from the IDPs 120 might be based on the schema shown in FIG. 5. For instance, each IDP 120 uses its own token (assigned by the LAI service 110) and data are populated using the same tenant ID (i.e., the tenant ID assigned by the LAI service to the AO application 105). In this way, the AO application 105 is a passive listener (consumer) of identity data produced by the IDPs 120 and brokered by the LAI service 110.

As discussed below, location data might be received both from the home networks and from VNs while the devices are roaming. In the former case, home networks often act as IDPs 120 as well. Hence, certain IDPs 120 could feed and update the AO application 105 with location data when the devices are not roaming. In the latter case, location updates may come from a VN connector, such or from the corresponding IDP 120 directly. In case the entities interfacing with the LAI service 110 use a connector, the connector ID might also be conveyed in the messages sent from the IDP connectors or the VN connectors. Location data may be received by the LAI service 110, processed, and pushed to the AO application 105 irrespective of the type of device and access technology used (e.g., LoRa, Wi-Fi, cellular, etc.). In FIG. 5, the AO uses three different IDPs 120, which correspond to three different wireless communication schemas (e.g., LoRa, Wi-Fi, and cellular), to enable the LAI service 110 to push location data of the AO's devices to the AO application 105.

In another embodiment, the AO application 105 may require explicit approval from the IDPs 120 before data can be streamed to the AO application 105. This covers the scenario of initially populating the AO application 105 with data coming from the source of truth (i.e., the IDPs). This might require explicit approval from the IDPs themselves (otherwise IDs won't show in the AO application 105). Obtaining explicit approval might use an SSO process supported by two/multi-factor authorization (2/MFA) or alternative verification means assuming the IDPs 120 are already registered with the LAI service 110. An explicit approval process could be instrumented vs. implicit (or inferred) binding, where IDPs 120 grant access to an AO application in the LAI service 110, rather than the other way around.

Figure 6:
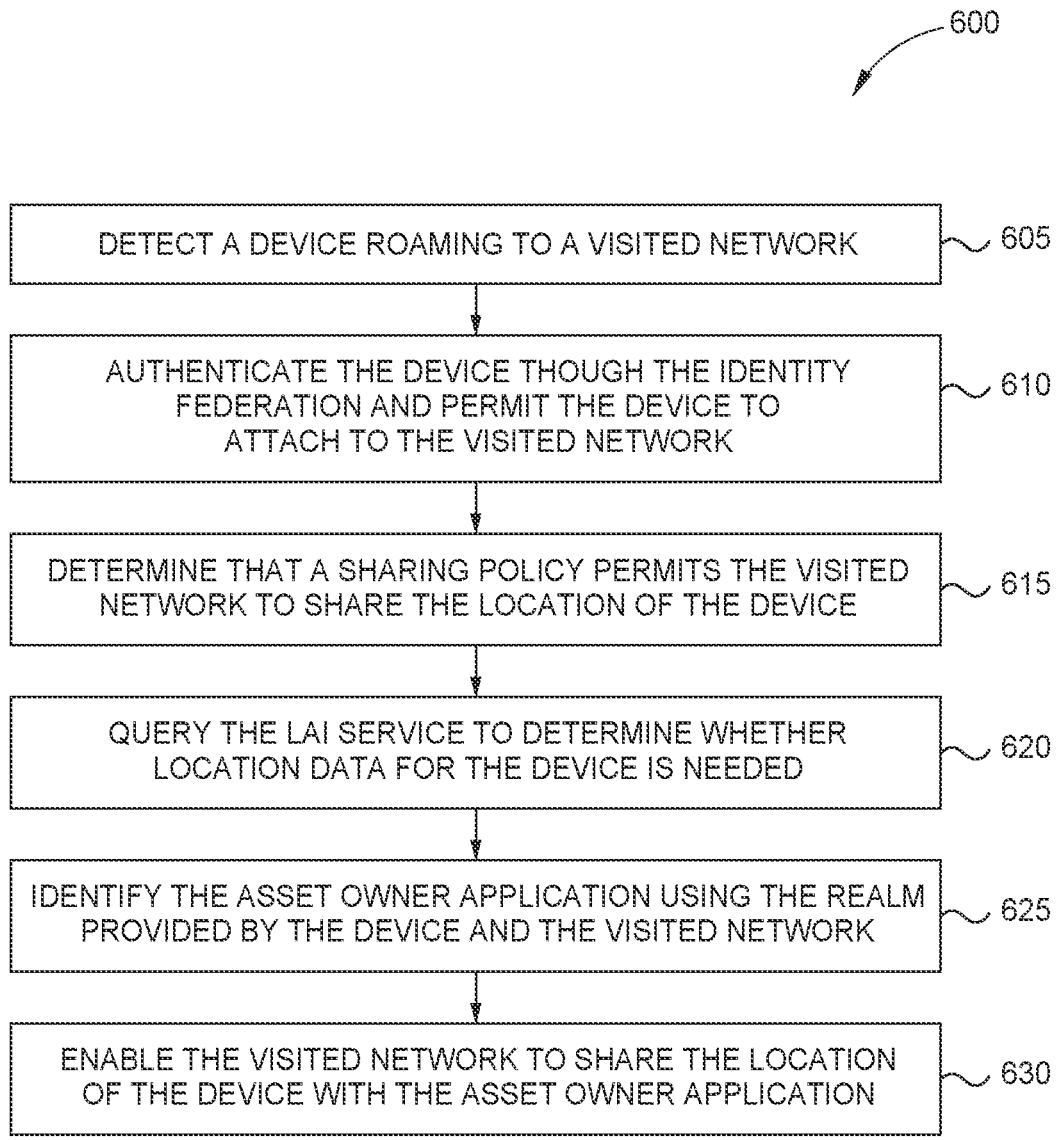
FIG. 6 is a flowchart for enabling a visited network to share location data with an AO application, according to one embodiment described herein.

FIG. 6 is a flowchart of a method 600 for enabling a VN to share location data with an AO application, according to one embodiment described herein. In one embodiment, the method 600 assumes that the method 200 has been performed to populate the table 400 in FIG. 4.

At block 605, a VN detects a roaming device. This is illustrated in FIG. 1 where the roaming device 135 has disconnected from its home network 130 and is now attempting to connect to the VN 150.

At block 610, the IDP authenticates the device through the identity federation and permits the device to attach to the VN. That is, the VN can use an identity federation (e.g., an open roaming federation) to authenticate the device. In one embodiment, as shown in FIG. 1, the VN connector 140 establishes a secure tunnel to the IDP connector 125 which permits the IDP 120 and VN 150 to exchange data for authenticating the device 135. This secure tunnel may be based on mutual authentication. In the case of Wi-Fi, the connectors could proxy and forward RADIUS messages over a WAN link (using RADSEC). For private cellular networks, the connectors could proxy DIAMETER messages over a WAN link and forward them to the corresponding DRA and HSS. For LoRa, the connectors could proxy and forward the Passive Roaming Start Requests (PRStartReq) and Passive Roaming Start Answers (PRStartAns) over a WAN link. The VN connectors may be standalone entities dealing with each access technology individually or architected as a single multi-access connector.

Once the device has been authenticated using the identity federation, the following blocks in the method 600 can be used to dynamically identify the AO application ID through the LAI service.

At block 615, the VN determines that a sharing policy permits the VN to share the location of the device. Based on a device ID, the VN determines whether the device is a roaming device or a local one and apply a predefined policy indicating whether the VN should or should not share location data of the device. This policy may be based on the particular realm provided in the device ID. That is, the VN can identify the realm from the device ID, and use this realm to index into the policy to determine whether the policy forbids or permits the VN to share location data for devices in that realm. That is, it is up to the VN policy to decide whether to check if an AO want to receive location data for its devices. The VN may also decide whether or not to send such data to a third-party entity using the realm in the device ID.

Assuming the policy permits the VN to show the location of the device, at block 620, the VN connector queries the LAI service to determine whether location data for the device (or for the realm) is needed. In one embodiment, the VN connector shares the device ID, the realm associated to that device, and other metadata (subject to privacy regulations) with the LAI service.

Figure 7:
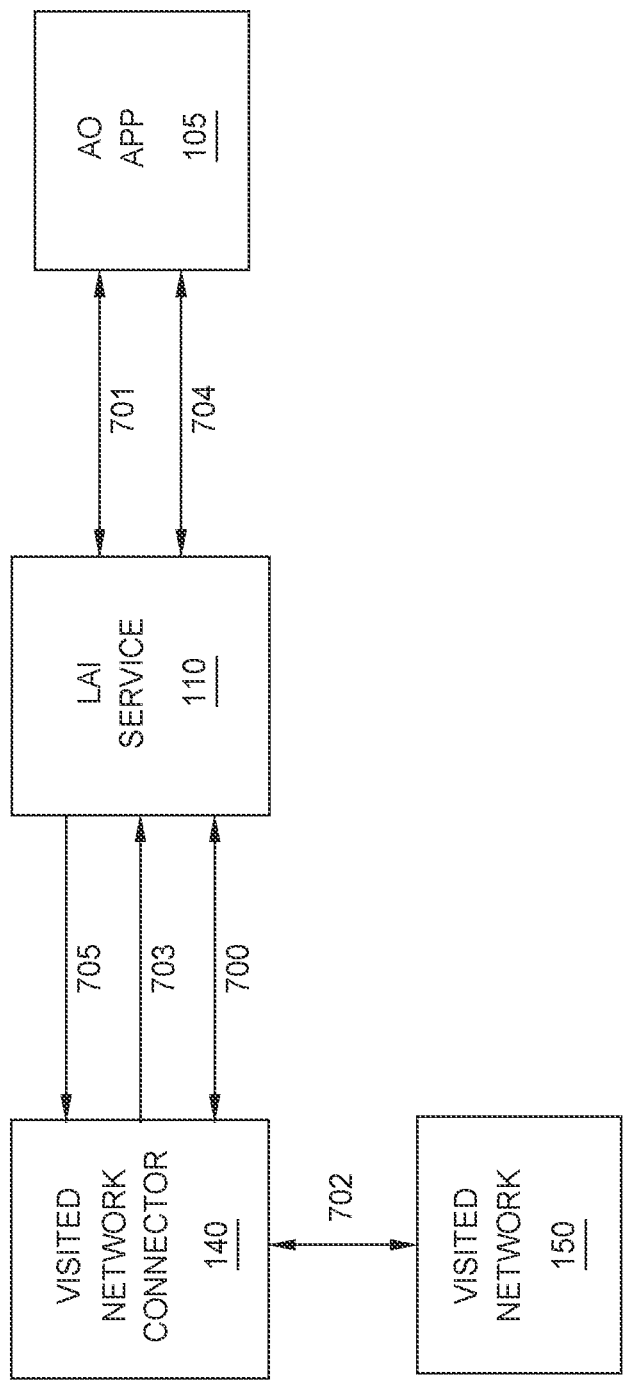
FIG. 7 illustrates a system for enabling a visited network to share location data with an AO application, according to one embodiment described herein.

FIG. 7 illustrates a system for enabling the VN 150 to share location data with an AO application, according to one embodiment described herein. The arrows 702 and 700 illustrate the VN 150 and VN connector 140 querying the LAI service 110 to determine whether location data for the device is needed, where the VN connector 140 provides the device ID, the realm associated with that device, and other metadata to the LAI service. In scenarios where government regulation (e.g., privacy regulation) restricts querying the LAI service using the device ID as an input, a combination of realm and second order factors might be used, as long as they support automated verification. For instance, a hash of an identifiable accounting log entry, a hash of an identifiable LoRa MAC frame, etc. For example, the VN connector may include all or a subset of the following parameters in the message sent to the LAI service (the first two are directed to the LAI service itself, while the last two are the ones that should be brokered and forwarded to the AO): the VN ID, the home network ID, the realm, or the device ID.

Returning to the method 600, at block 625, the LAI service identifies the AO application using the realm provided by the device and the VN connector. That is, with the realm, the LAI system can resolve the authorized tenant ID and dynamically determine the ID of the corresponding AO application. Using table 400 as an example, if the realm in the device ID was "enterprise_X.com", then the LAI service can identify the appropriate row that has the tenantID (X) and the AO application ID (URI_X).

At block 630, the LAI service enables the VN to share the location of the device with the AO application. The LAI service can broker the query sent by the VN connector to the AO application as shown by the arrow 701 in FIG. 7. In general, the query sent to the AO application 105 determines whether location data is needed for specific devices or an entire realm. The AO application then replies (also shown by arrow 701). The reply is brokered by the LAI service 110 and forwarded back to the VN connector 140 as shown by the arrow 700. If the query was accepted by the AO application 105, the LAI service 110 may return the AO Application ID to the VN connector 140 so that the VN 150 may obtain explicit consent (digitally signed) by the AO application 105 before sharing any location data with it, which is discussed in detail in FIG. 8. The LAI service 110 can also provide to the VN 150 the ID of the AO's IDP as per the realm sent in the query. The VN 150 can use this ID to verify and bind the AO Application ID to the IDP that authenticated the device during the roaming phase. In this manner, the IDP ID bonded to the just discovered AO application 105 is provided to the VN 150 by a trusted entity, i.e., the LAI service 110. The VN (or VN connector) can then begin to push location updates corresponding to the roaming device to the AO application 105.

In one embodiment, the VN pushes location data to the LAI service which in turn brokers and shares the updates with the corresponding AO application. In other embodiments, the VN can push the location data to the AO application without using the LAI service as an intermediary or broker. The location data might include the device ID and latitude and longitude coordinates. The update policy might be decided by the VN (e.g., only push location every S sec., every M min., every H hours every time the device changes its location, upon changes on the VN attached, etc.). Data sharing can be stopped by the VN, the LAI service or the AO application. For example, when the device leaves the venue, if it misbehaves, if an IDP deletes an ID from the LAI service, if the AO does not want to keep accumulating data sharing costs, etc.

In a further enhancement, the AO application may reply to the request from VN by allowing the VN to share location data with a third-party entity (e.g., for handling purposes, as part of an automated supply chain, for unmanned operations, etc.). Such third-party entities should be trusted within the LAI service. That is, these third-party entities may have already been registered with the LAI service and have a unique Application ID (e.g., a URI) and corresponding entries in the LAI service (e.g., a table like in FIG. 4). The corresponding (token, tenant ID) pair could be generated by the LAI service based on delegation from a valid AO tenant.

In another enhancement, incentive models might be used to foster data sharing. For instance, AOs might be willing to pay for such information. Likewise, the LAI service would have incentives to provide and scale out such service. The incentives for VNs might be based on direct monetization or indirect means to generate revenue (e.g., by offering such service, a port might attract more cargo).

Further, the techniques described above applies even for devices that might move within their home networks. That is, considering mobility without necessarily roaming, where both the AO and the service provider might benefit from getting accurate location data.

Figure 8:
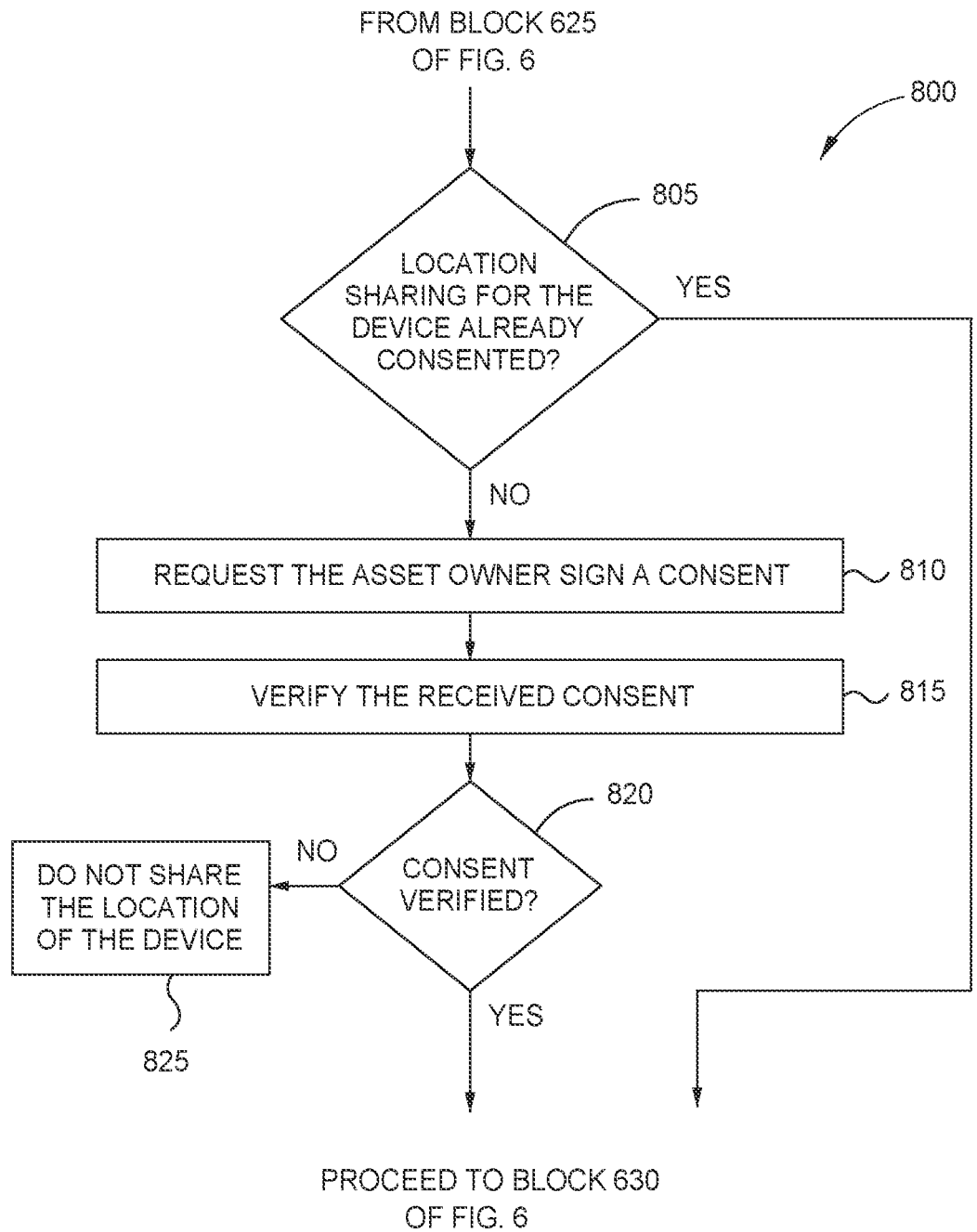
FIG. 8 is a flowchart for obtaining consent to share location data, according to one embodiment described herein.

FIG. 8 is a flowchart of a method 800 for obtaining explicit consent to share location data from the AO application, according to one embodiment described herein. In one embodiment, the method 800 is performed after block 625 where the LAI service has indicated to the VN which AO application should receive the location information for the roaming device.

At block 805, the VN first determines whether the AO application has already consented to sharing the location of the device. For example, a different device owned by the AO may have previously roamed to the VN where the AO gave its consent to share location data. The VN may have a local policy to authorize, and cache consented exchanges for a period of time before querying the LAI service again.

However, assuming consent was not previously given, the method 800 proceeds to block 810 where the VN requests that the AO application signs a consent. Using FIG. 7 as an example, the arrow 703 illustrates the VN connector 140 transmitting the request for consent to the LAI service 110 which, serving as a broker, forwards the request to the AO application 105 as shown by arrow 704.

A signed consent is then sent back to the VN connector as shown by the arrow 705. In FIG. 7, the exchanges concerning explicit consent are brokered by the LAI service 110, though other models could be applied as well, including direct peer-to-peer exchanges or using another system as the broker.

At block 815, the VN verifies the received consent. The VN could rely on the PKI to verify the AO application's signature as well as the data provided in block 625 of the method 600. Doing so allows the VN to verify whether the IDP ID matches the one that authenticated the device. Alternative options may include WC3 verifiable credentials (e.g., the IDP may vouch for a verifiable credential on behalf of the AO application), token-based mechanisms to bond the two, and the like.

If at block 820 the VN cannot verify the consent, the method 800 proceeds to block 825 where the VN does not share or push out location information related to the roaming device to the AO application or other third parties. However, assuming the consent is verified, the method 800 proceeds to block 630 of the method 600 as described above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    registering a plurality of identity providers (IDPs) with a location, aggregation, and insights (LAI) service, wherein the LAI service, the plurality of IDPs, and an asset owner (AO) are part of an identity federation;
    registering the AO with the LAI service, wherein registering the AO comprises selecting one of more of the IDPs already registered with the LAI service;
    binding, in the LAI service, the selected IDPs to an AO application of the AO, wherein the selected IDPs and the AO application have respective realms in common;
    after detecting a device has roamed to a visited network (VN) in the identity federation, receiving a realm associated with the device at the LAI service from the VN;
    identifying, at the LAI service, the AO application by matching the received realm to one of the respective realms; and
    enabling the VN to push location information corresponding to the device to the AO application.

2. The method of claim 1, wherein receiving the realm at the LAI service and identifying the AO application occurs after the device has been authenticated and the device has attached to the VN.

3. The method of claim 1, wherein binding the selected IDPs to the AO application further comprises:
    generating a table for the AO at the LAI service, the table linking the respective realms of the selected IDPs to the AO application.

4. The method of claim 3, further comprising:
assigning, at the LAI service, a tenant ID to the AO, a unique token to each of the plurality of IDPs, and an ID to the AO application, wherein the tenant ID, the unique token, and the ID of the AO application are used to generate the table.

5. The method of claim 4, further comprising:
receiving indications from the selected IDPs that they own the respective realms after establishing a relationship of trust between the LAI service and the selected IDPs; and
storing the respective realms in the table, wherein the respective realms are all linked to the ID of the AO application in the table.

6. The method of claim 1, further comprising, before enabling the VN to push the location information corresponding to the device to the AO application:
obtaining explicit consent from the AO application for the VN to provide the location information to the AO application or a third-party entity.

7. The method of claim 1, wherein the selected IDPs each correspond to a different wireless communication schema.

8. The method of claim 1, wherein the VN did not have a relationship of trust with the AO application before the device roamed to the VN but the VN did have a relationship of trust with the LAI before the device roamed to the VN.

9. A computing system, comprising:
a processor; and
memory storing an application configured to, when executed by the processor, perform an operation, the operation comprising:
registering a plurality of identity providers (IDPs) with a location, aggregation, and insights (LAI) service, wherein the LAI service, the plurality of IDPs, and an asset owner (AO) are part of an identity federation;
registering the AO with the LAI service, wherein registering the AO comprises selecting one of more of the IDPs already registered with the LAI service;
binding, in the LAI service, the selected IDPs to an AO application of the AO, wherein the selected IDPs and the AO application have respective realms in common;
after detecting a device has roamed to a visited network (VN) in the identity federation, receiving a realm associated with the device at the LAI service from the VN;
identifying, at the LAI service, the AO application by matching the received realm to one of the respective realms; and
enabling the VN to push location information corresponding to the device to the AO application.

10. The computing system of claim 9, wherein receiving the realm at the LAI service and identifying the AO application occurs after the device has been authenticated and the device has attached to the VN.

11. The computing system of claim 9, wherein the operation further comprises:
generating a table for the AO at the LAI service, the table linking the respective realms of the selected IDPs to the AO application;
assigning, at the LAI service, a tenant ID to the AO, a unique token to each of the plurality of IDPs, and an ID to the AO application, wherein the tenant ID, the unique token, and the ID of the AO application are used to generate the table;
receiving indications from the selected IDPs that they own the respective realms after establishing a relationship of trust between the LAI service and the selected IDPs; and
storing the respective realms in the table, wherein the respective realms are all linked to the ID of the AO application in the table.

12. The computing system of claim 9, wherein the operation further comprises, before enabling the VN to push the location information corresponding to the device to the AO application:
obtaining explicit consent from the AO application for the VN to provide the location information to the AO application or a third-party entity.

13. The computing system of claim 9, wherein the selected IDPs each correspond to a different wireless communication schema.

14. The computing system of claim 9, wherein the VN did not have a relationship of trust with the AO application before the device roamed to the VN but the VN did have a relationship of trust with the LAI before the device roamed to the VN.

15. A non-transitory computer readable medium having program instructions embodied therewith, the program instructions executable by a processor to perform an operation, the operation comprising:
registering a plurality of identity providers (IDPs) with a location, aggregation, and insights (LAI) service, wherein the LAI service, the plurality of IDPs, and an asset owner (AO) are part of an identity federation;
registering the AO with the LAI service, wherein registering the AO comprises selecting one of more of the IDPs already registered with the LAI service;
binding, in the LAI service, the selected IDPs to an AO application of the AO, wherein the selected IDPs and the AO application have respective realms in common;
after detecting a device has roamed to a visited network (VN) in the identity federation, receiving a realm associated with the device at the LAI service from the VN;
identifying, at the LAI service, the AO application by matching the received realm to one of the respective realms; and
enabling the VN to push location information corresponding to the device to the AO application.

16. The non-transitory computer readable medium of claim 15, wherein receiving the realm at the LAI service and identifying the AO application occurs after the device has been authenticated and the device has attached to the VN.

17. The non-transitory computer readable medium of claim 15, wherein the operation further comprises:
generating a table for the AO at the LAI service, the table linking the respective realms of the selected IDPs to the AO application;
assigning, at the LAI service, a tenant ID to the AO, a unique token to each of the plurality of IDPs, and an ID to the AO application, wherein the tenant ID, the unique token, and the ID of the AO application are used to generate the table;
receiving indications from the selected IDPs that they own the respective realms after establishing a relationship of trust between the LAI service and the selected IDPs; and
storing the respective realms in the table, wherein the respective realms are all linked to the ID of the AO application in the table.

18. The non-transitory computer readable medium of claim 15, wherein the operation further comprises, before enabling the VN to push the location information corresponding to the device to the AO application:
 obtaining explicit consent from the AO application for the VN to provide the location information to the AO application or a third-party entity.

19. The non-transitory computer readable medium of claim 15, wherein the selected IDPs each correspond to a different wireless communication schema.

20. The non-transitory computer readable medium of claim 15, wherein the VN did not have a relationship of trust with the AO application before the device roamed to the VN but the VN did have a relationship of trust with the LAI before the device roamed to the VN.

* * * * *